(12) United States Patent
Nanivadekar et al.

(10) Patent No.: US 10,872,017 B2
(45) Date of Patent: Dec. 22, 2020

(54) RESTORING A FILE SYSTEM OBJECT

(71) Applicant: Hewlett Packard Enterprise Development LP, Houston, TX (US)

(72) Inventors: Mandar Govind Nanivadekar, Karnataka (IN); Rohan A. Kulkarni, Karnataka (IN); Shishir Misra, Karnataka (IN); Albrecht Schroth, Herrenberg (DE)

(73) Assignee: Hewlett Packard Enterprise Development LP, Houston, TX (US)

( * ) Notice: Subject to any disclaimer, the term of this patent is extended or adjusted under 35 U.S.C. 154(b) by 669 days.

(21) Appl. No.: 14/895,445

(22) PCT Filed: Jun. 3, 2013

(86) PCT No.: PCT/IN2013/000352
§ 371 (c)(1),
(2) Date: Dec. 2, 2015

(87) PCT Pub. No.: WO2014/195957
PCT Pub. Date: Dec. 11, 2014

(65) Prior Publication Data
US 2016/0110262 A1    Apr. 21, 2016

(51) Int. Cl.
*G06F 11/14* (2006.01)
*G06F 16/11* (2019.01)
*G06F 13/42* (2006.01)

(52) U.S. Cl.
CPC ...... *G06F 11/1456* (2013.01); *G06F 11/1469* (2013.01); *G06F 13/4282* (2013.01);
(Continued)

(58) Field of Classification Search
CPC combination set(s) only.
See application file for complete search history.

(56) References Cited

U.S. PATENT DOCUMENTS 7,885,938 B1    2/2011  Greene et al.
7,937,545 B1 *  5/2011  Wu .................... G06F 11/1448
                                                      709/219
(Continued)

FOREIGN PATENT DOCUMENTS

CN    101647006    2/2010
CN    102253871    11/2011

OTHER PUBLICATIONS

CA Technologies; "Virtual Server System and Data Protection, Recovery and Availability with CA ARCserve® r16"; Oct. 2011; 16 pages.

(Continued)

*Primary Examiner* — James Trujillo
*Assistant Examiner* — Kurt A Mueller
(74) *Attorney, Agent, or Firm* — Hewlett Packard Enterprise Patent Department

(57) ABSTRACT

Techniques associated with restoring a file system object are described in various implementations. In one example, a method may include receiving a request to restore a file system object, the file system object being stored in backup data produced from a raw image backup of a file system. The method may also include determining whether the backup data is accessible from an on-premise storage system, and retrieving blocks of data associated with the file system object from the backup data without restoring the file system. The data blocks may be retrieved from the on-premise storage system if the backup data is accessible from the on-premise storage system, or from the off-premise storage system if the backup data is not accessible from on-premise storage system. The method may also include causing the file system object to be restored.

20 Claims, 6 Drawing Sheets

(52) U.S. Cl.
CPC .......... *G06F 16/11* (2019.01); *G06F 11/1451* (2013.01); *G06F 2201/815* (2013.01)

(56) References Cited

U.S. PATENT DOCUMENTS

| | | | | |
|---|---|---|---|---|
| 8,126,847 | B1* | 2/2012 | Zheng | G06F 11/1469 |
| | | | | 707/640 |
| 8,200,638 | B1* | 6/2012 | Zheng | G06F 11/1469 |
| | | | | 707/679 |
| 8,346,826 | B2 | 1/2013 | Torri et al. | |
| 8,930,423 | B1* | 1/2015 | Surampudi | H04L 63/0428 |
| | | | | 380/259 |
| 2009/0248759 | A1* | 10/2009 | Okada | G06F 11/1456 |
| 2011/0196842 | A1* | 8/2011 | Timashev | G06F 11/1469 |
| | | | | 707/679 |
| 2011/0307657 | A1* | 12/2011 | Timashev | G06F 11/1451 |
| | | | | 711/112 |
| 2012/0066677 | A1 | 3/2012 | Tang | |
| 2012/0239624 | A1 | 9/2012 | Barnes et al. | |
| 2013/0073589 | A1 | 3/2013 | Smith et al. | |

OTHER PUBLICATIONS

Cloud access.net, "Compliant Cloud Backup: a True Enterprise Backup Service" at least as early as May 2013 (10 pages).
The State Intellectual Property, the PR China, International Search Report and Written Opinion of the International Searching Authority for PCT/IN2013/000352 dated Mar. 6, 2014 (11 pages).
Veritas Software Corporation; "Veritas Netbackup Flashbackup"; Aug. 2001; 11 pages.
Extended European Search Report dated Dec. 20, 2016 for EP Application No. 13886603.3; pp. 9.

* cited by examiner

RESTORING A FILE SYSTEM OBJECT

BACKGROUND

Many companies place a high priority on the protection of data. In the business world, the data that a company collects and uses is often the company's most important asset, and even a relatively small loss of data or data outage may have a significant impact. In addition, companies are often required to safeguard their data in a manner that complies with various data protection regulations. As a result, many companies have made sizeable investments in data protection and data protection strategies.

As one part of a data protection strategy, many companies perform backups of portions or all of their data. Data backups may be executed on an as-needed basis, but more typically are scheduled to execute on a recurring basis (e.g., nightly, weekly, or the like). Such data backups may serve different purposes. For example, one purpose may be to allow for the recovery of data that has been lost or corrupted. Another purpose may be to allow for the recovery of data from an earlier time—e.g., to restore previous versions of files and/or to restore a last known good configuration.

DETAILED DESCRIPTION

Figure 1A:
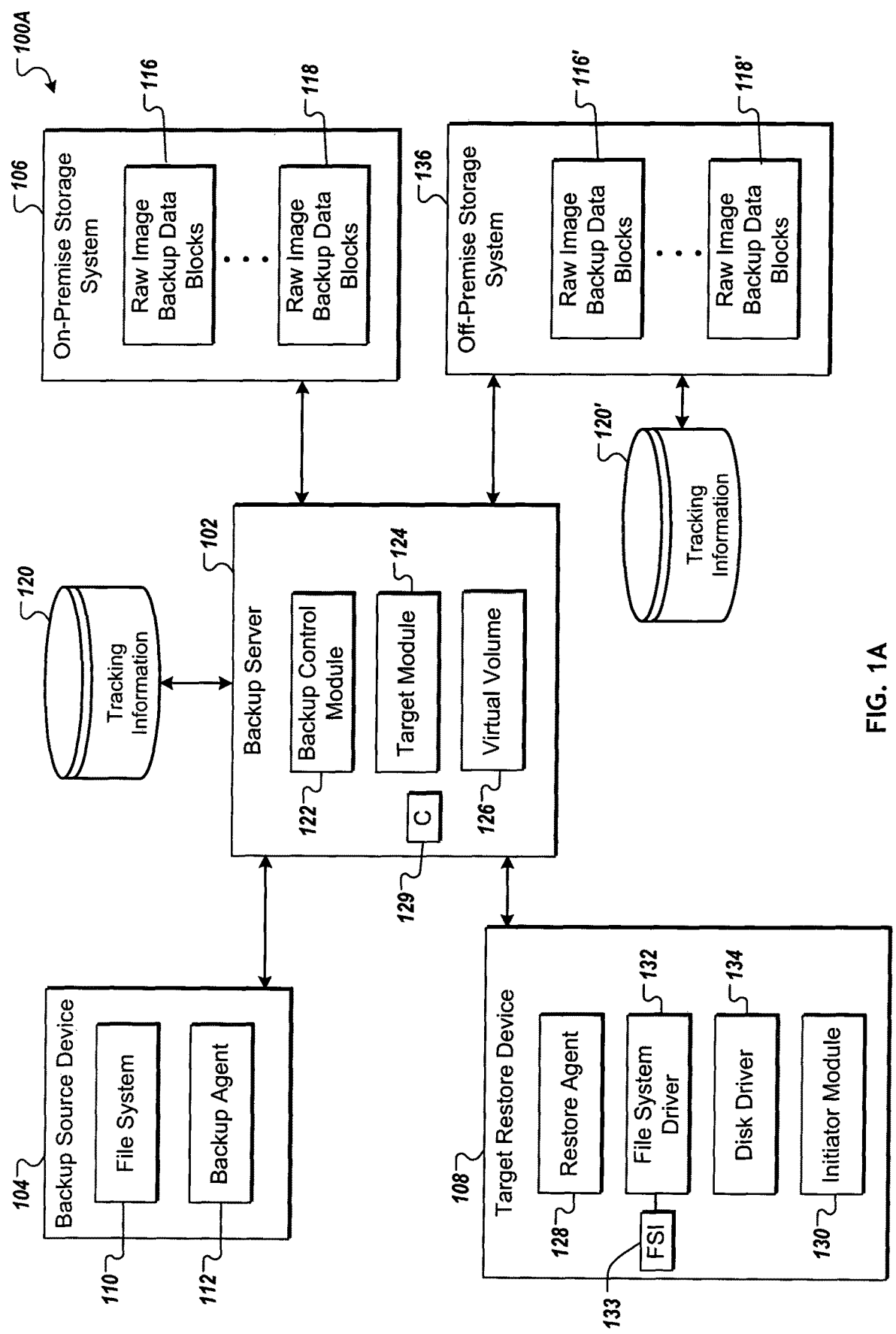
FIGS. 1A and 1B are block diagrams of example backup environments in accordance with implementations described herein.

Computer systems often store data in file systems, which maintain data in a logical arrangement of files and directories. The files and directories contained within a file system may be organized in a hierarchical or other appropriate manner. In some cases, the files and directories of a file system may be backed up to a backup storage system to protect the files and directories in case of a fault or other condition that may cause data loss at the computer system. In the ensuing discussion, files and/or directories of a file system may generally be referred to as "file system objects".

The speed at which file systems can be backed up may depend on a number of factors. Factors that may affect how quickly a backup may be performed may include, for example, the type of backup being performed (e.g., file system backup or raw image backup; full, incremental, or differential backup, etc.), the amount of data being backed up, the constitution of the dataset (e.g., the number and size of files being backed up), disk fragmentation, and/or several other factors. If the data is being backed up over a network, then network bandwidth may also affect the speed of the backup. In some cases, a slow backup may reduce performance of the source computer system, the backup computer system (e.g., a backup server or a network of servers), the backup storage devices used to store the backup data, and/or the network or networks interconnecting the various devices.

In backup systems, the slowest component within the backup chain will generally cause a bottleneck in terms of the overall speed of the backup. In some cloud-based or other network-based backups, network bandwidth may be the limiting factor for backup speed. However, in other cases, especially where the file system includes a relatively large number of relatively small-sized files that are backed up using a file system backup, the bottleneck may shift from the network to the source computing device. In such cases, a file system backup may include walking the entire file system, processing each of the files in the file system (e.g., by opening, reading, and closing each file), gathering metadata for each of the files, and performing other actions to maintain the file system structure of files and directories. Such processing, especially for relatively large file systems, may incur significant overhead in terms of backup time and storage space.

Another type of data backup, known as a raw image backup, transfers the underlying data from a file system block by block (as a raw image) to a backup storage system without necessarily maintaining the file system structure at the backup storage system. The raw image backup process bypasses the file system, and instead accesses a mount point (entry point to the file system) and backs up data from the mount point block by block as raw data. The raw image backup operation may be faster than a file system backup operation, since the amount of time involved in performing the raw image backup operation may be independent of the number of file system objects stored in the file system and may also be independent of the type of file system.

In the case of a raw image backup, a catalog or other metadata about the data may be generated asynchronously, e.g., after the backup is complete, or during the backup. The catalog for a raw image backup may include only the basic tree structure of the file system (e.g., starting from the mount point) and need not contain specific location information of files. Since the file system structure is not provided with the raw image backup, performing a restore operation for an individual file system object (or for selected file systems objects, but not the entire file system) from the raw image backup data may be more challenging than a single file restore from a file system backup.

In some cases, a file system reverse engineering process may be used when performing a raw image backup of data in a file system. During the raw image backup operation, the file system reverse engineering process creates a mapping of file system objects and raw image backup data blocks that are backed up to the backup storage location. The mapping may be used to restore an individual file system object.

Performing a file system reverse engineering process as part of a raw image backup operation may increase the complexity of the raw image backup operation. For example, different file systems to be backed up may have different file system structures that are to be interpreted as part of the file system reverse engineering process. Also, the file system reverse engineering process may rely on routines that may be unsupported by an entity that provided the file system data. As a result, a file system structure produced using such routines may be incorrect. Moreover, as new file systems are introduced, code for the file system reverse engineering process may need to be updated and/or maintained, which may lead to further complexity, increased maintenance costs, and/or lengthened backup product release cycles.

Described herein are techniques for performing image-based backups of file systems to a networked storage location, such as the cloud, while still allowing for single file restore of file system objects. In some implementations, the raw image backup of a file system may be temporarily stored in an on-premise storage system, such as a cache or other appropriate temporary storage in a data center, and may subsequently be copied to an off-premise storage system, such as a public, private, or hybrid cloud. Using such an approach, the backup data may be transferred over the network, e.g., asynchronously and/or at a convenient time, such as when network availability and/or throughput is high and/or when network traffic is low.

When a request to restore one of the file system objects from the backed up file system is received, the system may retrieve the blocks associated with that file system object without restoring the entire file system. The blocks may be retrieved from either the on-premise storage (if still available), or from the off-premise storage if the blocks are no longer available from the on-premise storage. Restoring the file system object from the on-premise cache may, in some cases, provide faster restore of recently backed up data.

FIG. 1A is a block diagram of an example backup environment 100A in accordance with implementations described herein. As shown, the example backup environment 100A includes a backup server 102 communicatively coupled to a backup source device 104, an on-premise storage system 106, a target restore device 108, and an off-premise storage system 136. The backup server 102, backup source device 104, on-premise storage system 106, and target restore device 108 may physically be located in a particular location, such as in a data center, while the off-premise storage system 136 may be located in a different physical location (or locations), such as the cloud. The example topology of environment 100A may be representative of various backup environments. However, it should be understood that the example topology of environment 100A is shown for illustrative purposes only, and that various modifications may be made to the configuration. For example backup source device 104 and target restore device 108 are shown as separate devices, but in some implementations, the devices may be a single device or may otherwise be implemented as part of the same computing system. Similarly, environment 100A may include different or additional components, or the components may be implemented in a different manner than is shown.

In operation, a file system 110 from backup source device 104 may be backed up in a raw image backup to produce raw image backup data. The raw image backup data may initially, and temporarily, be stored in the on-premise storage system 106, e.g., as collections 116, 118 of raw image backup data blocks. At an appropriate time, e.g., soon after the initial backup has completed, or at a time when network bandwidth availability and throughput are high, the raw image backup data may be copied from the on-premise storage system 106 to the off-premise storage system 136, and may be stored, e.g., as collections 116', 118' of raw image backup data blocks.

After the raw image backup data has been copied to the off-premise storage system 136, the raw image backup data may immediately (or soon thereafter) be deleted from the on-premise storage system 106, or may be retained for a period of time. In some cases, the retention period may be governed by a data retention policy, which may be configured to provide desired backup and restoration performance characteristics for the system. For example, the data retention policies may ensure that restore service level agreements (SLAs) can be provided for recently backed up data (e.g., guaranteeing that a file backed up during the previous day, will be restored within fifteen minutes of the restore request). In such an example, the backup data would be stored on the on-premise storage system 106 for at least twenty four hours to ensure that the data is stored locally and may be restored from the on-premise storage system in a timely manner. Other data retention policies may be based on the priority level of the backups (e.g., higher priority backups may be retained on-premise for longer periods of time than lower priority backups), or based on other appropriate data retention factors.

While the raw image backup data is stored in the on-premise storage system 106, the off-premise storage system 136, or both, the target restore device 108 may request one or more files from the file system 110 to be restored to the device 108. In the event that the blocks of raw image backup data necessary to restore the requested files are accessible from the on-premise storage system, the file system objects may be retrieved from the on-premise storage system 106 without restoring the entire file system. In such cases, on-premise restoration may be performed faster than off-premise restoration. In the event that the blocks of raw image backup data necessary to restore the requested files are not accessible from the on-premise storage system, the file system objects may be retrieved from the off-premise storage system 136, again without restoring the entire file system. Such restoration may be referred to as single file restore.

Although not depicted in FIG. 1A, the backup server 102 may be communicatively coupled to the backup source device 104, on-premise storage system 106, target restore device 108, and/or off-premise storage system 136 via one or multiple networks, such as a local area network (LAN), a storage area network (SAN), a wide area network (WAN), or over combinations of appropriate networks. Although only one backup source device 104, one target restore device 108, one on-premise storage system 106, and one off-premise storage system 136 are depicted in FIG. 1A, it is noted that other example environments may include multiple backup source devices, multiple backup restore devices, and/or multiple backup storage systems. In some implementations, some of the backup source devices may include different types of file systems.

Each of the backup source device 104 and target restore device 108 may be implemented as any of various appropriate computer systems. Also, the backup server 102 may be implemented as a single computer system, or as multiple computer systems. The on-premise storage system 106 and the off-premise storage system 136 may each be implemented with one or multiple storage devices.

The backup source device 104 may include a file system 110 containing file system objects (files and directories). The file system 110 may also include component(s) for managing the access of file system objects. Such component(s) may be in the form of machine-readable instructions (that may include software and/or firmware). The file system 110 may also include data structures used for organizing the file system objects. For example, the file system 110 may include a hierarchical tree structure, or other appropriate structure, in which the file system objects may be arranged at different hierarchical levels.

The backup source device 104 may also include a backup agent 112 configured to perform a raw image backup of data in the file system 110 to the backup server 102. In the raw image backup, the backup agent 112 may bypass the file system 110, and instead may access a mount point at which data of the file system 110 is located. A mount point may refer to the access point of the file system. In a raw image backup, the file system data may be transferred as raw data on a block-by-block basis (rather than a file-by-file basis) to cause the blocks of raw image backup data to be transferred to the backup server 102, and subsequently to a storage system. Transferring raw image backup data blocks from the backup source device 104 to the backup server 102 may include copying the raw image backup data blocks.

The raw image backup data blocks of the raw image backup may be stored in the on-premise storage system 106, as collections 116, 118 of raw image backup data blocks. Copies of the raw image backup data blocks of the raw image backup may be stored in the off-premise storage system 136, as collections 116', 118' of raw image backup data blocks. Although only one on-premise storage system 106 and off-premise storage system 136 are shown in example backup environment 100A, the raw image backup data blocks of the raw image backup may be split across multiple backup storage systems in other examples.

Various forms of processing may be performed on the raw image backup data. Such processing may include, for example, compression or deduplication of the raw image backup data blocks, or other appropriate forms of processing, and may be performed, e.g., by the backup server 102. For example, in some cases, the backup server 102 may perform deduplication processing before storing the data in the on-premise storage system 106. As another example, the backup server 102 may perform deduplication processing after the data is stored in the on-premise storage system 106, but before the data is copied to the off-premise storage system 136. Deduplication before the data is copied off-premise may reduce the amount of data transferred over the network. In some implementations, such processing may also or alternatively be performed by other appropriate computing systems, such as a standalone data processing device (e.g., a standalone compression device, a standalone deduplication device, or the like).

Different portions and/or versions of the file system 110 may be backed up in different raw image backup sessions. For example, a first version of data in the file system 110 may be backed up in a first raw image backup session (which may be a full backup session in which all data in the file system 110 is backed up). When data in the file system 110 is later modified, the backup agent 112 may perform an incremental backup, where only changed data blocks in the file system 110 are backed up in another raw image backup session. The changed data may include data that is different from the last backup. Changes to data in the file system 110 may be due to insertion of a file system object, deletion of a file system object, or modification of a file system object. In the example shown, the collection 116 of raw image backup data blocks may correspond to a first raw image backup session, while the collection 118 of raw image backup data blocks may correspond to another raw image backup session. Similarly, the collection 116' of raw image backup data blocks may correspond to a copy of the first raw image backup session, while the collection 118' of raw image backup data blocks may correspond to copies of another raw image backup session.

Backup server 102 may maintain a database containing tracking information 120 associated with backups that have been performed. For example, tracking information 120 may include information associating raw image backup data blocks with respective raw image backup sessions, information describing the configuration of the backup source device 104 when the backup was performed, information identifying locations of respective raw image backup data blocks in the respective on-premise and/or off-premise storage systems, and/or any other appropriate information to allow the backup server 102 to restore one or more files from the raw image backup data.

The database containing the tracking information 120 may be stored in a storage subsystem of the backup server 102, or alternatively, stored on a storage subsystem that is separate from the backup server 102. In some cases, the database containing the tracking information 120 may be stored in the on-premise storage system 106. A copy of all or portions of tracking information 120 may be stored as tracking information 120', which may be stored off-premise, e.g., in the off-premise storage system 136 or in another location that is accessible by the off-premise storage system 136.

In some implementations, the backup server 102 may use the tracking information 120 to determine which raw image backup session a particular block of data is part of. Thus, when the backup server 102 receives a request for the particular block, the backup server 102 may retrieve raw image backup data blocks from the respective collection stored in either the on-premise storage system 106 or the off-premise storage system 136 that corresponds to the respective raw image backup session.

In some implementations, the tracking information 120 may also associate raw image backup data blocks with respective backup stores of the on-premise storage system 106 or the off-premise storage system 136. In some examples, the on-premise storage system 106 and/or the off-premise storage system 136 may be divided into multiple physical backup stores or multiple logical backup stores. Different collections of raw image backup data blocks corresponding to respective raw image backup sessions may be stored in different backup stores of the respective storage systems. Thus, in some examples, a first backup store of a storage system may store a collection of raw image backup data blocks that corresponds to a first raw image backup session, and a second backup store of the storage system may store a different collection of raw image backup data blocks that corresponds to a second raw image backup session. By using the tracking information 120 that indicates where in the respective storage systems each raw image backup data block is located, the backup server 102 may access the appropriate backup store of the on-premise storage system 106 or the off-premise storage system 136, e.g., via a secure communication channel.

The tracking information 120 may also include other information, such as information describing the configuration of the backup source device 104 when the backup was performed. For example, the tracking information 120 may identify the backup source device 104 that is being backed up, the host platform, the type and/or version of file system that is being backed up, the image size, the backup mode, and the like. Such information may be referred to as session information, and may allow the backup server 102 to instantiate an appropriate virtual machine for performing a restore operation as described in greater detail below.

The backup server 102 may include a backup control module 122 configured to store raw image backup data blocks received from the backup source device 104 in the on-premise storage system 106. The backup control module 122 may also create the tracking information 120 as part of each raw image backup operation. The backup control module 122 may also be configured to copy raw image backup data from the on-premise storage system 106 to the off-premise storage system 136, e.g., asynchronously, at an appropriate time.

The backup server 102 may also include a target module 124, configured to present (e.g., make accessible) a virtual volume 126 that contains raw image backup data blocks retrieved by the backup control module 122 from either the on-premise storage system 106 or the off-premise storage system 136. In some implementations, target module 124 may simulate an Internet Small Computer System Interface (iSCSI) target, allowing the virtual volume 126 to be presented for access by the target restore device 108.

The virtual volume 126 may be generated by the backup control module 122 by retrieving the respective raw image backup data blocks and including the retrieved raw image backup data blocks in the virtual volume 126. The retrieved respective blocks may include blocks from a particular raw image backup session (full or incremental or both); additionally, the retrieved respective blocks may include blocks from a number of incremental backup sessions and one full backup session, which may be combined virtually to construct the virtual volume based on the respective file (e.g., as selected by a user) which is to be restored.

The virtual volume 126 may be presented (e.g., made accessible) to the target restore device 108, which is able to restore individual file system objects based on the raw image backup data blocks contained in the virtual volume 126. Note that presenting a virtual volume does not necessarily involve the transfer of all of the blocks of a raw image backup. Rather, the raw image backup data blocks may be transferred on demand. Note also that a mechanism may be provided to make the virtual volume 126 read-only, in some examples.

The virtual volume 126 differs from a file system volume (e.g., C:\ volume, D:\ volume, etc.), since the blocks of the virtual volume 126 may reside anywhere in any storage, and the blocks of the virtual volume 126 may be compressed, encrypted, and/or deduplicated, for example. When a particular block of the virtual volume 126 is requested, such as by the target restore device 108, that block may be extracted from the relevant storage and may be decompressed, decrypted, and/or un-deduplicated and provided to the requester. Note that deduplication may be different for different systems from different vendors, and the backup server 102 may be configured to accommodate the different deduplication approaches.

The backup server 102 does not necessarily attempt to decode file system objects corresponding to the raw image backup data blocks in the virtual volume 126. Rather, the target restore device 108 may transfer the appropriate raw image backup data blocks from the virtual volume 126. Then, based on the transferred raw image backup data blocks, a restore agent 128 in the target restore device 108 may restore the requested file system object or objects.

It is noted that the virtual volume 126 may include raw image backup data blocks for a particular raw image backup session. In some examples, multiple virtual volumes may be presented by the target module 124 for multiple raw image backup sessions.

In other examples, multiple backups (including a full backup and one or multiple incremental backups of respective raw image backup sessions) may be consolidated and stored as a single raw backup image, which may be presented as a respective virtual volume. The full backup and incremental backup(s) may be combined to create a final backup image that is related to a version or view of a file system at a particular point in time. If deduplication is applied, performing the foregoing consolidation may not require much additional storage space.

The target restore device 108 further may include an initiator module 130 configured to cooperate with the target module 124 to retrieve raw image backup data blocks from the virtual volume 126 to allow the restore agent 128 to restore individual file system object(s). During a restore operation, the initiator module 130 may send commands to the target module 124 to retrieve identified raw image backup data blocks from the virtual volume 126 for use in restoring at least one individual file system object. During a restore operation, the initiator module 130 and target module 124 communicate so that the initiator module identifies the respective virtual volume from the target module.

In some examples, the initiator module 130 may be an Internet Small Computer System Interface (iSCSI) initiator module, and the target module 124 in the backup server 102 may generate one or more iSCSI targets. An iSCSI initiator may send a SCSI command to an iSCSI target, to perform a data access operation. In the arrangement of FIG. 1A, the data access operation is performed with respect to the virtual volume 126 presented by the iSCSI target. A description of iSCSI may be found in Request for Comments (RFC) 3720, entitled "Internet Small Computer Systems Interface (iSCSI)," dated April 2004.

In other examples, the initiator module 130 and target module 124 are modules related to performing Fibre Channel communications. Fibre Channel provides a relatively high-speed network technology used for storage networking. The standards for Fibre Channel are provided by the International Committee for Information Technology Standards (INCITS). In the context of a Fibre Channel environment, the initiator module 130 is able to send Fibre Channel commands to the target module 124 to perform data access operations with respect to the virtual volume 126. The virtual volume 126 may be a Fibre Channel logical unit identified by a logical unit number (LUN).

The target restore device 108 further may include a file system (not shown), a file system driver 132, and a disk driver 134. The file system of target restore device 108 may be similar to or different from the file system 110 of backup source device 104. The file system driver 132 may be provisioned with file system information 133 to allow the file system driver 132 to understand the file system 110 of the backup source device 104.

The disk driver 134 may work in conjunction with the file system driver 132 to obtain blocks related to the file system object(s) to be restored. The file system driver 132 knows which raw image backup data blocks are to be retrieved for restoring a particular file system object. The file system driver 132 requests these blocks from the disk driver 134, which in turn causes the initiator module 130 to send commands to the target module 124 for retrieving the desired blocks. Although referenced as a "disk driver," it is noted that in alternative implementations, the driver 134 may operate with storage devices other than disk-based storage devices. In addition, although depicted as multiple modules, it is noted that the restore agent 128, file system driver 132, disk driver 134, and initiator module 130 in the target restore device 108 may be integrated into fewer modules. Similarly, the backup control module 122 and the target module 124 in the backup server 102 may be integrated into one module.

The target restore device 108 may also access a catalog 129 stored at the backup server 102 or at another storage location. The catalog 129 may include a list of files and directories of a volume. The catalog 129 may be accessed and used by the restore agent 128 to present, to a user or other entity, file system objects that may be restored. The user or other entity may select the file system object(s) to restore. There may be one catalog created per full or incremental backup session.

The catalog 129 may or may not be created at raw image backup time. If the catalog 129 does not exist, then during a restore operation, the restore agent 128 may itself perform the scan on the virtual volume 126 and show the list of file system objects contained in the virtual volume 126 to allow the user or other entity to select the file system objects to restore.

In accordance with some implementations, rather than configuring the backup server 102 with information that allows the backup server 102 to understand the file system, the target restore device 108 may be provided the file system information 133 pertaining to the file system 110. As a result, the target restore device 108 may be configured to identify file system objects from the virtual volume 126 presented by the backup server 102. The retrieval of raw image backup data blocks for the identified file system objects may be a relatively simple operation using a communication protocol such as iSCSI or Fibre Channel, as discussed above.

Figure 1B:
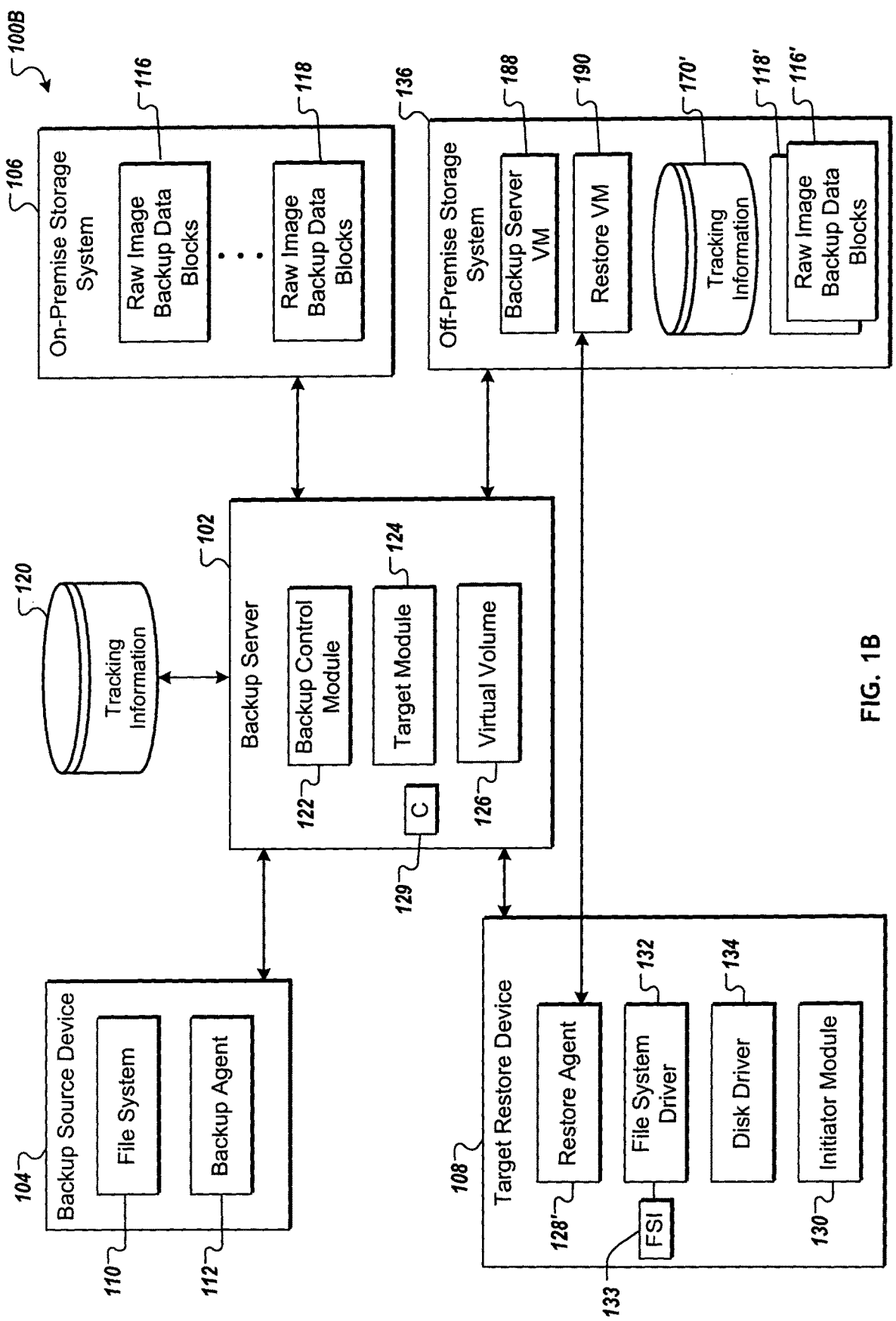

FIG. 1B is a block diagram of an example backup environment 100B in accordance with implementations described herein. As shown, the example backup environment 100B includes many of the same components as backup environment 100A, including a backup server 102 communicatively coupled to a backup source device 104, an on-premise storage system 106, a target restore device 108, and an off-premise storage system 136. Similar to backup environment 100A, the backup server 102, backup source device 104, on-premise storage system 106, and target restore device 108 may physically be located in a particular location, such as in a data center, while the off-premise storage system 136 may be located in a different physical location (or locations), such as the cloud.

Each of the components described in connection with environment 100A may generally operate in a similar manner in environment 100B, except that in environment 100B, the target restore device 108 may communicate directly with the off-premise storage system 136 to restore one or more file system objects. In such an implementation, portions or all of the functionality of backup server 102 may be performed in the off-premise storage system 136, e.g., by a backup server virtual machine 188, which may be instantiated using tracking information 170'. Similarly, portions of the functionality of target restore device 108 may be performed in the off-premise storage system 136, e.g., by a restore virtual machine 190, which may also be instantiated using tracking information 170'.

In operation, a file system 110 from backup source device 104 may be backed up in a raw image backup to produce raw image backup data. The raw image backup data may initially, and temporarily, be stored in the on-premise storage system 106, e.g., as collections 116, 118 of raw image backup data blocks. At an appropriate time, e.g., soon after the initial backup has completed, or at a time when network bandwidth availability and throughput are high, the raw image backup data may be copied from the on-premise storage system 106 to the off-premise storage system 136, and may be stored, e.g., as collections 116', 118' of raw image backup data blocks.

To restore a file system object from the raw image backup data blocks, the backup server virtual machine 188 may simulate an iSCSI target, generate an iSCSI virtual volume, and present the virtual volume to the restore virtual machine 190. In some implementations, the iSCSI target may be simulated as storage across the cloud such that the target restore device 108 may access the virtual volume, e.g., over a secure communication channel, and perform a file copy of the desired data.

The restore virtual machine 190 may be configured to retrieve requested data from the virtual volume by identifying the file system of the backed up data and reading the files using appropriate file system APIs. Restore virtual machine 190 may simulate a virtual restore agent (not shown) that may perform similar functions as the restore agent 128 shown in FIG. 1A. After the file has been restored by restore virtual machine 190, the file may be communicated, e.g., over a secure communication channel, back to the target restore device 108 such that the file may be restored. In the example of FIG. 1B, the restore agent 128' may communicate with the restore virtual machine 190 to request one or more file system objects to be restored. The restore virtual machine 190 (e.g., the virtual restore agent simulated by restore virtual machine 190) may be configured to interpret the file system, similar to such functionality as described with respect to restore agent 128 of FIG. 1A, retrieve the requested file system objects, and provide the file system objects back to the restore agent 128', e.g., over a secure communication channel. The restore agent 128' may then write the file system objects to the file system to complete the restoration.

The example topology of environment 100B may be representative of various backup environments. However, it should be understood that the example topology of environment 100B is shown for illustrative purposes only, and that various modifications may be made to the configuration. For example, in some implementations, backup server virtual machine 188 and restore virtual machine 190 may be implemented as a single virtual machine that performs both functionalities, assuming that the backup source device 104 and the target restore device 108 are of the same or compatible platform types. Similarly, environment 100A may include different or additional components, or the components may be implemented in a different manner than is shown.

Figure 2A:
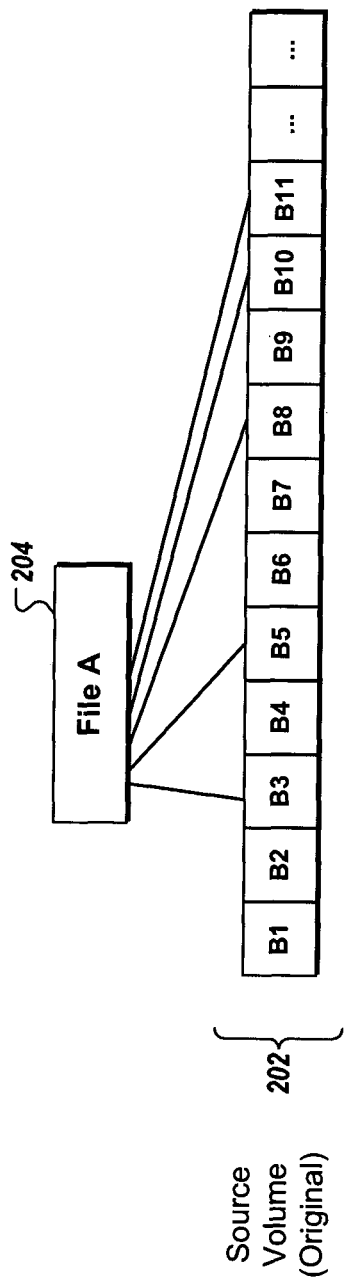
FIGS. 2A and 2B are conceptual diagrams of blocks of an example file system in accordance with implementations described herein.
Figure 2B:
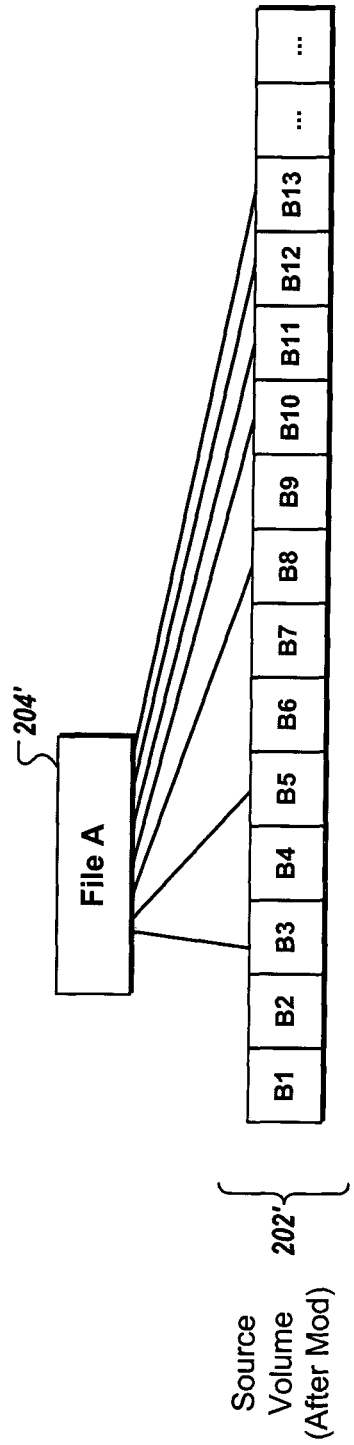

FIGS. 2A and 2B are conceptual diagrams of blocks of an example file system, e.g., file system 110 of FIG. 1A or FIG. 1B, in accordance with implementations described herein. For example, the source volume containing a particular file, e.g., File A 204, may be the C:\ volume of a computing device. Each block is identified by a Bi label (where i=1, 2 . . . ). In FIG. 2A, blocks B1-B11 are shown. In the example of FIG. 2A, a particular file, File A 204, may include blocks B3, B5, B8, B10, and B11. The source volume of FIG. 2A shows the source volume at a specific point in time. In an example, it is assumed that the blocks 202 of the source volume of FIG. 2A may be backed up to the backup server 102 of FIG. 1A or FIG. 1B in a full raw image backup session, where all of the blocks of the source volume are transferred to the backup server 102.

FIG. 2B shows the source volume after a modification has been made. The modified source volume may include blocks 202'. In the example of FIG. 2B, it is assumed that File A 204 has been modified, where modified File A is referenced as 204'. In the example of FIG. 2B, File A 204 has been modified by adding two blocks B12 and B13.

In this simple example, an incremental raw image backup session may be performed with respect to the blocks 202', which backs up of only blocks B12 and B13 to the on-premise storage system 106 (since blocks B1-B11 remain unchanged).

To restore the latest version of File A 204', each of the following blocks would be retrieved (such as by using the catalog 129 in the backup server 102): B3, B5, B8, B10, B11, B12, and B13. To do so, the backup server 102 would retrieve raw image backup data blocks from two raw image backup sessions (the full backup session and the incremental backup session). For example, the catalog for a full backup may show that File A, File B (not shown), and File C (not shown) have been backed up. The catalog for incremental backup may show that only File A has been backed up. During restore, the user may be shown two versions of File A: File A (from the full backup), and File A (from the incremental backup).

Based on the version to be restored, the virtual volume 126 may be constructed using the tracking information 120 to fetch appropriate blocks from the full and incremental backups.

Figure 3:
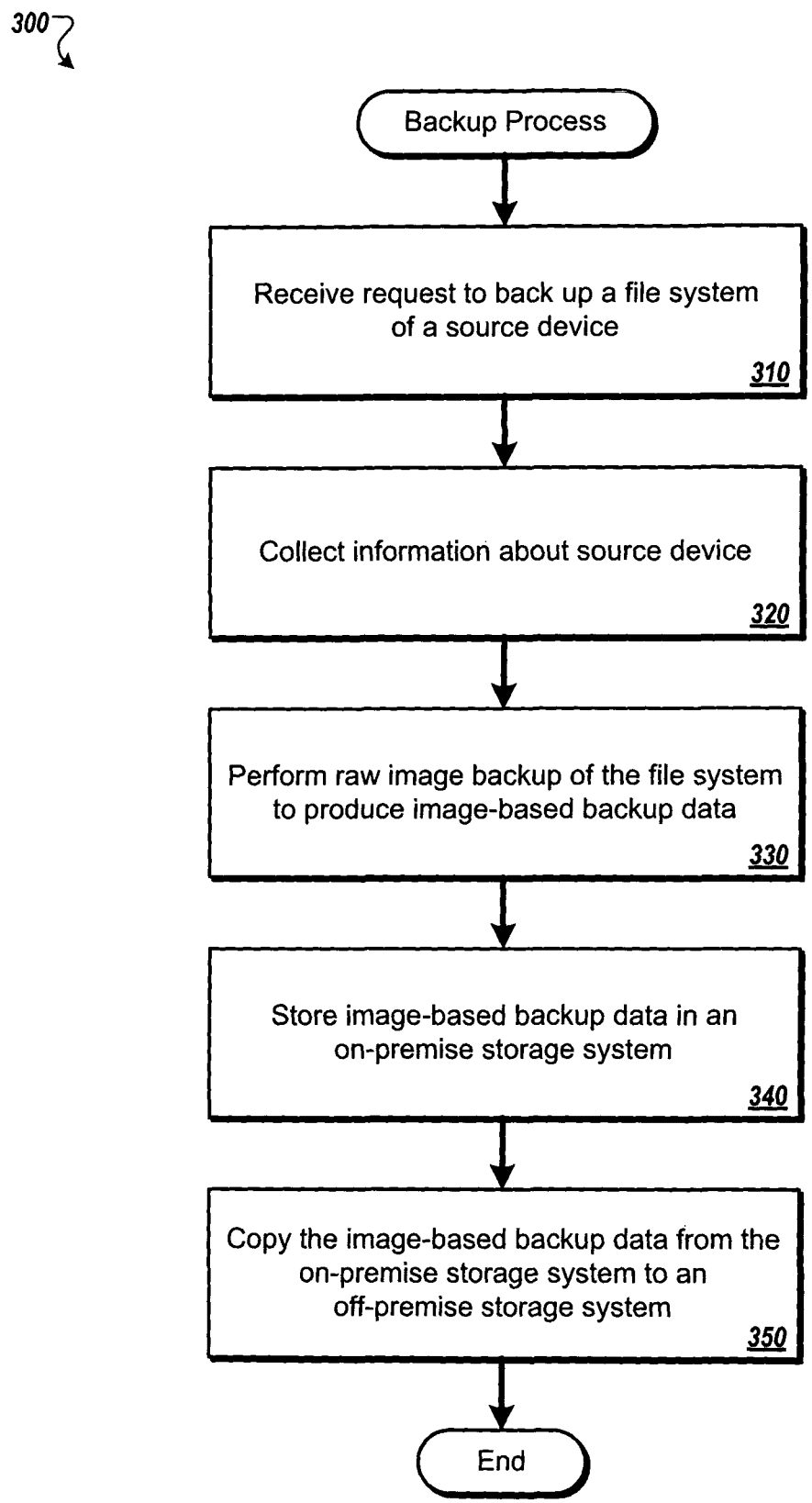
FIG. 3 is a flow diagram of an example process for backing up a file system using a raw image backup in accordance with implementations described herein.

FIG. 3 is a flow diagram of an example process for backing up a file system using a raw image backup in accordance with implementations described herein. The process 300 may be performed, for example, by a backup server such as the backup server 102 illustrated in FIG. 1. For clarity of presentation, the description that follows uses the backup server 102 illustrated in FIG. 1A or FIG. 1B as the basis of an example for describing the process. However, it should be understood that another system, or combination of systems, may be used to perform the process or various portions of the process.

Process 300 beings at block 310, when a request to back up a file system of a source device is received. The request may be a user-generated request, a system-generated request, an automated request, or another appropriate type of request. For example, a user may request that a backup operation be performed on an ad hoc basis, or backup operations may be performed on a recurring or scheduled basis.

At block 320, information about the source device is collected. The information collected about the source device may include any appropriate information that may later be used during a restore operation, including session information associated with the backup operation. Such session information may include, for example, host platform, host file system type/version, image size, full/incremental backup mode, image location, and the like.

At block 330, a raw image backup of the file system is performed to produce image-based backup data. During a raw image backup operation, the backup server 102 may receive from the backup source device 104 file system data that is transferred and stored as raw data on a block-by-block basis (rather than a file-by-file basis).

At block 340, the image-based backup data may be stored, at least temporarily, in an on-premise storage system, e.g., in a local cache, and at block 350, the image-based backup data may be copied from the on-premise storage-system to an off-premise storage system, e.g., to a cloud-based storage system.

The timing of when block 350 is performed relative to block 340 may be based on a number of factors, including, for example, on-premise workload, network availability, network traffic, network throughput, off-premise availability, off-premise workload, or other appropriate factors. For example, the image-based backup data may be transferred to the off-premise storage system at a convenient time, such as when network availability and/or throughput is high and/or when network traffic is low. In some implementations, backup data transfer may be throttled, or otherwise controlled, such as by transferring lower quantities of data during business hours, and higher quantities of data during off-peak hours. These and other appropriate data transfer policies may be configurable, and may be implemented based on the desired characteristics of the backup system.

After the raw image backup data has been copied to the off-premise storage system, the raw image backup data may immediately (or soon thereafter) be deleted from the on-premise storage system, or may be retained for a period of time. The retention period may be governed by a data retention policy, which may be configurable, and may be implemented to provide desired backup and restoration performance characteristics for the system. For example, the data retention policies may ensure that restore service level agreements (SLAs) can be provided for recently backed up data. Other data retention policies may be based on the priority level of the backups, or may be based on other appropriate data retention factors.

Figure 4:
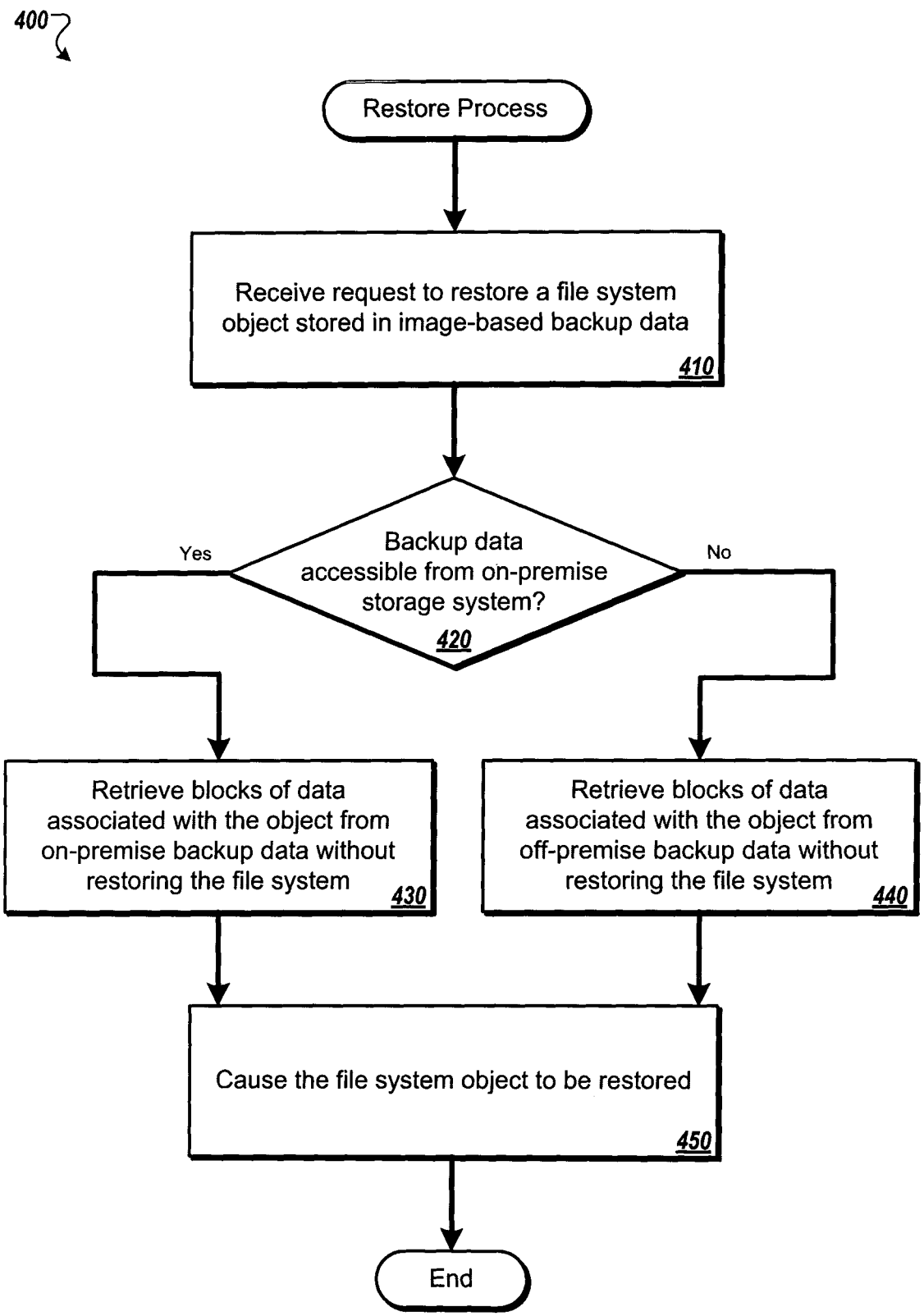
FIG. 4 is a flow diagram of an example process for restoring a file system object from image-based backup data in accordance with implementations described herein.

FIG. 4 is a flow diagram of an example process for restoring a file system object from image-based backup data in accordance with implementations described herein. The process 400 may be performed, for example, by a backup server such as the backup server 102 illustrated in FIG. 1A or FIG. 1B. Portions or all of the process 400 may also or alternatively be performed, for example, by a virtual machine such as the backup server virtual machine 188 illustrated in FIG. 1B. For clarity of presentation, the description that follows uses the backup server 102 illustrated in FIG. 1A or FIG. 1B as the basis of an example for describing the process. However, it should be understood that another system, or combination of systems, may be used to perform the process or various portions of the process.

Process 400 begins at block 410, when a request to restore a file system object stored in image-based backup data is received. The request may be a user-generated request, a system-generated request, an automated request, or another appropriate type of request. For example, a user may request that a particular file be restored to a target device. The target device may be the source device from which the backup was taken, or may be a different device.

At block 420, it is determined whether the backup data necessary to restore the requested file is accessible from an on-premise storage system, such as a local cache. For example, the backup server 102 or a restore agent executing on a restore device may identify the raw image backup data blocks that are necessary to restore the requested file system object, and the backup server 102 may determine whether those blocks are available from the on-premise storage system. For example, the backup server 102 may query the local cache to determine whether the data blocks containing the requested file are still stored in the local cache. As another example, the backup server 102 may query tracking information to determine whether the appropriate data blocks are still stored in the local cache.

If the backup data necessary to restore the requested file is accessible from the on-premise storage system, then the blocks of data associated with the requested file system object may be retrieved from the on-premise backup data without restoring the file system at block 430. For example, the backup server 102 may create a custom iSCSI target from the raw image data stored in the local cache, and the restore target can mount the iSCSI volume to locate and retrieve the data of interest.

If the backup data necessary to restore the requested file is not accessible from the on-premise storage system, then the blocks of data associated with the file system object may be retrieved from the off-premise backup data without restoring the file system at block 440. For example, in some implementations, the backup server 102 may present (e.g., make accessible) a virtual volume that contains raw image backup data blocks retrieved from the off-premise storage system as described in FIG. 1A. As another example, a backup server virtual machine may be instantiated, e.g., in the cloud, based on the session information collected during the raw image backup, and the backup server virtual machine may create a custom iSCSI target, thus allowing a virtual volume to be presented, e.g., to a restore virtual machine instantiated in the cloud, such that the necessary backup data may be retrieved and provided, e.g., over a secure communication channel, back to the target restore device 108.

At block 450, the file system object may be restored. For example, the transferred blocks of raw image backup data received by the target restore device 108 may be used to restore the requested file system object at the target restore device 108. In some implementations, the target restore device 108 may operate in conjunction with a virtual machine, such as the restore virtual machine 190 illustrated in FIG. 1B to retrieve and restore the requested file system object to the target restore device 108.

Figure 5:
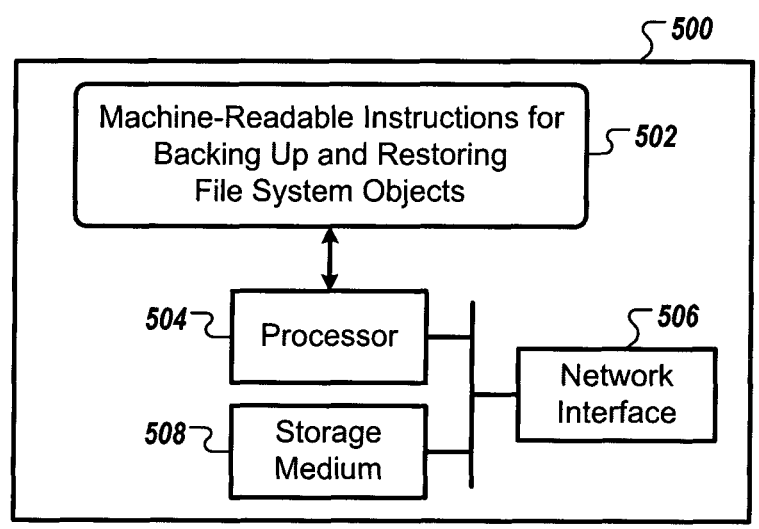
FIG. 5 is a block diagram of an example system in accordance with implementations described herein.

FIG. 5 is a block diagram of an example system 500 in accordance with implementations described herein. Example system 500 may be representative of any one of the backup server 102, backup storage device 104, or target restore device 108, of FIG. 1. The system 500 may include machine-readable instructions 502 for backing up and restoring file system objects. In some implementations, the machine-readable instructions may include any one of the backup agent 112, backup control module 122, and/or restore agent 128 of FIG. 1. The machine-readable instructions 502 are executable on one or multiple processors 504.

A processor may include a microprocessor, microcontroller, processor module or subsystem, programmable integrated circuit, programmable gate array, or another control or computing device. The processor(s) 504 may be coupled to the network interface 506 to allow the system 500 to communicate over a network, and to a storage medium (or storage media) 508.

The storage medium (or storage media) 508 may be implemented as one or multiple computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above may be provided on one computer-readable or machine-readable storage medium, or alternatively, may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

Although a few implementations have been described in detail above, other modifications are possible. For example, the logic flows depicted in the figures may not require the particular order shown, or sequential order, to achieve desirable results. In addition, other steps may be provided, or steps may be eliminated, from the described flows. Similarly, other components may be added to, or removed from, the described systems. Accordingly, other implementations are within the scope of the following claims.

What is claimed is:

1. A method performed by a backup computing system, comprising:

receiving a request to restore a file system object to a target computing device, the file system object stored in image-based backup data produced from a raw image backup of a file system containing the file system object, the image-based backup data including multiple collections of data blocks corresponding to different raw image backup sessions for respective different versions of data of the file system, the multiple collections of data blocks being initially stored in an on-premise storage system and subsequently copied from the on-premise storage system to an off-premise storage system;

determining, using tracking information that associates the multiple collections of data blocks with respective data stores in the on-premise and off-premise storage systems, where data blocks of the file system object are located, the tracking information comprising session information describing a configuration of the file system;

based on the tracking information, retrieving a first data block of the file system object from the on-premise storage system, and causing instantiation, at the off-premise storage system, of a backup virtual machine based on the session information, and of a restore virtual machine; and causing restoration of the file system object to the target computing device based on retrieved data blocks including the first data block retrieved from the on-premise storage system, and a second data block retrieved, from the off-premise storage system, based on interaction between the restore virtual machine and the backup virtual machine.

2. The method of claim 1, further comprising generating a virtual volume, and storing the first and second data blocks in the virtual volume that is accessible by the target computing device for transferring the retrieved data blocks to the target computing device.

3. The method of claim 2, wherein the backup virtual machine at the off-premise storage system presents the virtual volume using an Internet Small Computer System Interface (iSCSI) target that is used by the restore virtual machine to access the virtual volume to retrieve the second data block.

4. The method of claim 2, wherein the backup computing system presents the virtual volume as a Fibre Channel logical unit, and wherein transferring the retrieved data blocks to the target computing device comprises transferring the retrieved data blocks via Fibre Channel communications.

5. The method of claim 2, wherein the virtual volume is generated based on the session information generated when the file system was backed up.

6. The method of claim 1, wherein the first data block is part of a first collection of data blocks for a first raw image backup session, and the second data block is part of a second collection of data blocks for a second raw image backup session.

7. The method of claim 6, wherein the first raw image backup session is a full raw image backup session that performs a full backup of the file system, and the second raw image backup session is an incremental raw image backup session that performs an incremental backup of changed data of the file system.

8. The method of claim 1, wherein the restore virtual machine at the off-premise storage system identifies the file system and accesses the second data block using an application programming interface (API) of the file system.

9. The method of claim 1, wherein the session information further comprises an identifier of a backup source device from which the file system was backed up.

10. A backup system comprising:
a processor; and
a non-transitory storage medium storing instructions executable on the processor to:
receive a request to restore a file system object to a target computing device, the file system object in image-based backup data based on a raw image backup of a file system, wherein the image-based backup data includes multiple collections of data blocks corresponding to different raw image backup sessions for respective different versions of data of the file system, and wherein data blocks of the multiple collections of data blocks are in an on-premise storage system and an off-premise storage system;
determine, using tracking information that associates the multiple collections of data blocks with respective data stores in the on-premise and off-premise storage systems, where data blocks of the file system object are located, the tracking information identifying locations of the data blocks of the file system object in the on-premise and off-premise storage systems, and comprising session information describing a configuration of the file system;
based on the tracking information, retrieve a first data block of the file system object from the on-premise storage system, and cause instantiation, at the off-premise storage system, of a backup virtual machine based on the session information, and of a restore virtual machine; and
cause the file system object to be restored to the target computing device based on retrieved data blocks including the first data block retrieved from the on-premise storage system, and a second data block retrieved from the off-premise storage system using the restore virtual machine and the backup virtual machine.

11. The backup system of claim 10, wherein the instructions are executable on the processor to:
generate a virtual volume;
store the first and second data blocks in the virtual volume;
present the virtual volume to the target computing device; and
transfer the first and second data blocks from the virtual volume to the target computing device.

12. The backup system of claim 11, wherein the instructions are executable on the processor to present the virtual volume using an Internet Small Computer System Interface (iSCSI) target, and wherein the first and second data blocks are to be transferred from the iSCSI target to an iSCSI initiator at the target computing device.

13. The backup system of claim 11, wherein the virtual volume is based on the session information generated when the file system was backed up.

14. The backup system of claim 10, wherein the first data block is part of a first collection of data blocks for a first raw image backup session, and the second data block is part of a second collection of data blocks for a second raw image backup session.

15. The backup system of claim 14, wherein the first raw image backup session is a full raw image backup session that performs a full backup of the file system, and the second raw image backup session is an incremental raw image backup session that performs an incremental backup of changed data of the file system.

16. A non-transitory computer-readable storage medium storing instructions that, when executed by one or more processors, cause the one or more processors to:
receive a request to restore a file system object to a target computing device, the file system object being stored in image-based backup data based on a raw image backup of a file system containing the file system object, wherein the image-based backup data includes multiple collections of data blocks corresponding to different raw image backup sessions for respective different versions of data of the file system, and data blocks of the multiple collections of data blocks are in an on-premise storage system and an off-premise storage system;
determine, using tracking information that associates the multiple collections of data blocks with respective data stores in the on-premise and off-premise storage systems, where data blocks of the file system object are located, the tracking information comprising session information describing a configuration of the file system;
based on the tracking information, retrieve a first data block of the file system object from the on-premise storage system, and cause instantiation, at the off-premise storage system, of a backup virtual machine based on the session information, and of a restore virtual machine; and
restore the file system object to the target computing device based on retrieved data blocks including the first data block retrieved from the on-premise storage system, and a second data block retrieved, from the off-premise storage system, based on interaction between the restore virtual machine and the backup virtual machine.

17. The non-transitory computer-readable storage medium of claim 16, wherein the instructions when executed cause the one or more processors to:
generate a virtual volume;
store the first and second data blocks in the virtual volume;
present the virtual volume to the target computing device; and
cause transfer of the first and second data blocks to the target computing device.

18. The non-transitory computer-readable storage medium of claim 17, wherein the virtual volume is presented using an Internet Small Computer System Interface (iSCSI) target, and wherein causing transfer of the first and second data blocks comprises causing transfer of the first and second data blocks from the iSCSI target to an iSCSI initiator at the target computing device.

19. The non-transitory computer-readable storage medium of claim 16, wherein the first data block is part of a first collection of data blocks for a first raw image backup session, and the second data block is part of a second collection of data blocks for a second raw image backup session.

20. The non-transitory computer-readable storage medium of claim 16, wherein the session information further comprises an identifier of a backup source device from which the file system was backed up.

\* \* \* \* \*